(12) United States Patent
Gutierrez et al.

(10) Patent No.: US 8,466,394 B2
(45) Date of Patent: Jun. 18, 2013

(54) METHOD FOR DETECTING AND COMPENSATING NOISES IN INDUCTION HEATING SYSTEMS FOR DOMESTIC AND PROFESSIONAL KITCHEN AND INDUCTION HEATING SYSTEM USING SUCH METHOD

(75) Inventors: Diego Neftali Gutierrez, Varese (IT); Carlo Calesella, Castelmassa (IT); Francesco Del Bello, Rome (IT); Jurij Paderno, Varedo (IT)

(73) Assignee: Whirlpool Corporation, Benton Harbor, MI (US)

( * ) Notice: Subject to any disclaimer, the term of this patent is extended or adjusted under 35 U.S.C. 154(b) by 261 days.

(21) Appl. No.: 12/858,487

(22) Filed: Aug. 18, 2010

(65) Prior Publication Data
US 2011/0062150 A1    Mar. 17, 2011

(30) Foreign Application Priority Data
Sep. 11, 2009    (EP) ..................... 09170016

(51) Int. Cl.
*H05B 6/06*    (2006.01)
(52) U.S. Cl.
USPC .......................................... 219/620; 219/663

(58) Field of Classification Search
USPC .......... 219/620, 660, 661, 663, 624; 700/300; 374/102
See application file for complete search history.

(56) References Cited

U.S. PATENT DOCUMENTS

| | | | | |
|---|---|---|---|---|
| 4,473,732 | A * | 9/1984 | Payne | 219/625 |
| 5,450,305 | A * | 9/1995 | Boys et al. | 363/24 |
| 6,469,282 | B1 * | 10/2002 | Roberts | 219/481 |
| 2005/0247696 | A1 * | 11/2005 | Clothier | 219/497 |

FOREIGN PATENT DOCUMENTS

| | | | |
|---|---|---|---|
| EP | 1420613 | A2 | 5/2004 |
| EP | 1732357 | A2 | 12/2006 |

* cited by examiner

*Primary Examiner* — Caridad Everhart
(74) *Attorney, Agent, or Firm* — Daniel M. Blakeslee

(57) ABSTRACT

A method for detecting and compensating the effects of disturbances in controlling induction heating systems by monitoring the temperature of the cooking vessel or its content on the basis of at least one electrical measurement correlated to said temperature. An analysis in time and/or frequency domain of said electrical measurement is carried out in order to detect and compensate the effect of cooking vessel movements and/or mains line voltage fluctuation or similar electrical noises.

18 Claims, 11 Drawing Sheets

METHOD FOR DETECTING AND COMPENSATING NOISES IN INDUCTION HEATING SYSTEMS FOR DOMESTIC AND PROFESSIONAL KITCHEN AND INDUCTION HEATING SYSTEM USING SUCH METHOD

BACKGROUND OF THE INVENTION

Field of the Invention

The present disclosure relates to a method for detecting and/or compensating the effects of disturbances in controlling induction heating systems, particularly the effects of disturbances in monitoring and controlling the temperature of cooking vessels and the content thereof. More particularly, the present disclosure relates to a method applied to controls for detecting at least an electrical parameter correlated to power delivered by the induction heating system.

In several applications one or more electrical signals are observed because of their typical correlation with the temperature of the cooking vessel or its content. However, such correlation is usually not robust enough due to several exogenous disturbances such as mains voltage variations, electrical measurement noises or cooking vessel movements. This lack of robustness can lead to a decrease in performance or unexpected behavior of the system.

The term "noise" will be used herein to identify any type of disturbance that can affect the correlation between the observed electrical measurement(s) and the temperature of the cooking vessel and/or its content.

The basic structure of an induction heating system consists of a power converter connected to an induction coil. Every induction heater includes a means for monitoring electrical magnitudes of the system. The control must rely on such electrical magnitudes unless further expensive sensors are added to the system.

Knowing that a fundamental control regulates the power supplied to induction heating systems and therefore to cooking vessels, other typical applications are temperature control, boil detection and its derived controls (i.e., empty pot detection, boil dry detection or frying control). Unless further sensors are added to the system, these controls rely on the correlation of one or more electrical magnitudes with the observed process.

SUMMARY OF THE INVENTION

An object of the present disclosure is to provide a method for detecting and eventually compensating the effect of all the disturbances that affect the functions that monitor and/or control the temperature of the cooking vessel and/or its contents on the basis of at least one electrical measurement correlated to the temperature of the cooking vessel and/or its contents.

The detection and compensation is necessary for the applicability of relative temperature controls using electrical magnitude(s) of the system in every real application, where robustness to typical noises must be guaranteed.

The disclosure provides a compensation process of the electrical magnitude, measured by induction control that outputs a compensated signal. This compensated signal can be used in substitution of the raw input signal or can be used together with it as additional information about the process. The robustness of the monitoring control functions are guaranteed even in presence of noises.

DETAILED DESCRIPTION OF AN EMBODIMENT OF THE DISCLOSURE

Figure 1:
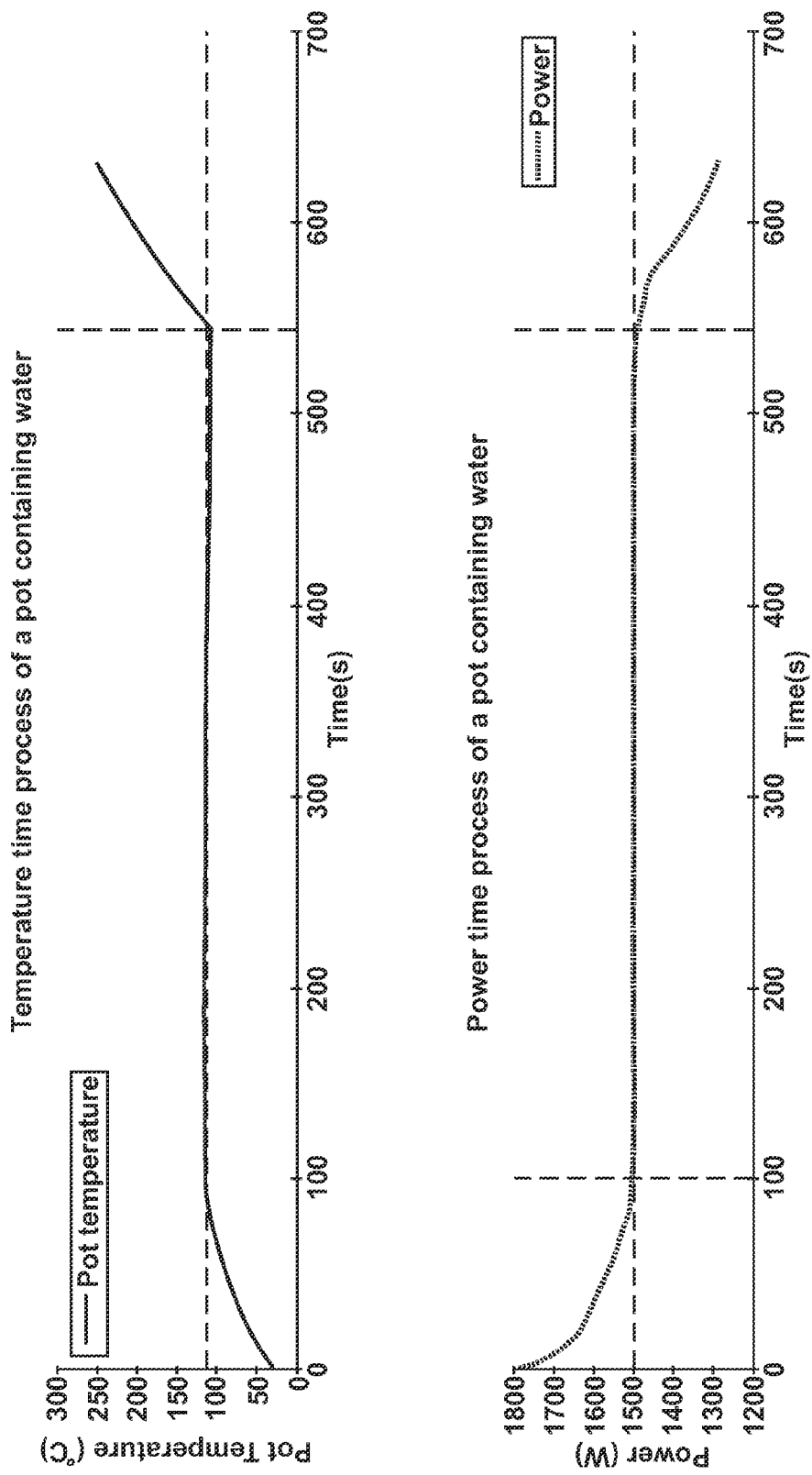
FIG. 1 are graphs depicting the behavior of a pot containing water when it is heated from ambient temperature to boiling temperature.

As shown in FIG. 1, the typical behavior of a pot containing water when it is heated from ambient temperature to boiling temperature is such that after a certain time period, the water reaches its boiling temperature and is reflected in the temperature of the pot. When all water is evaporated, the pot's temperature starts rising again.

In this example the pot is heated with an induction heater supplied at constant frequency. The supplied power is the measured electrical magnitude, which is correlated with temperature. By monitoring the power, the control system can detect when water starts boiling and when all water is evaporated (boiled dry).

Figure 2:
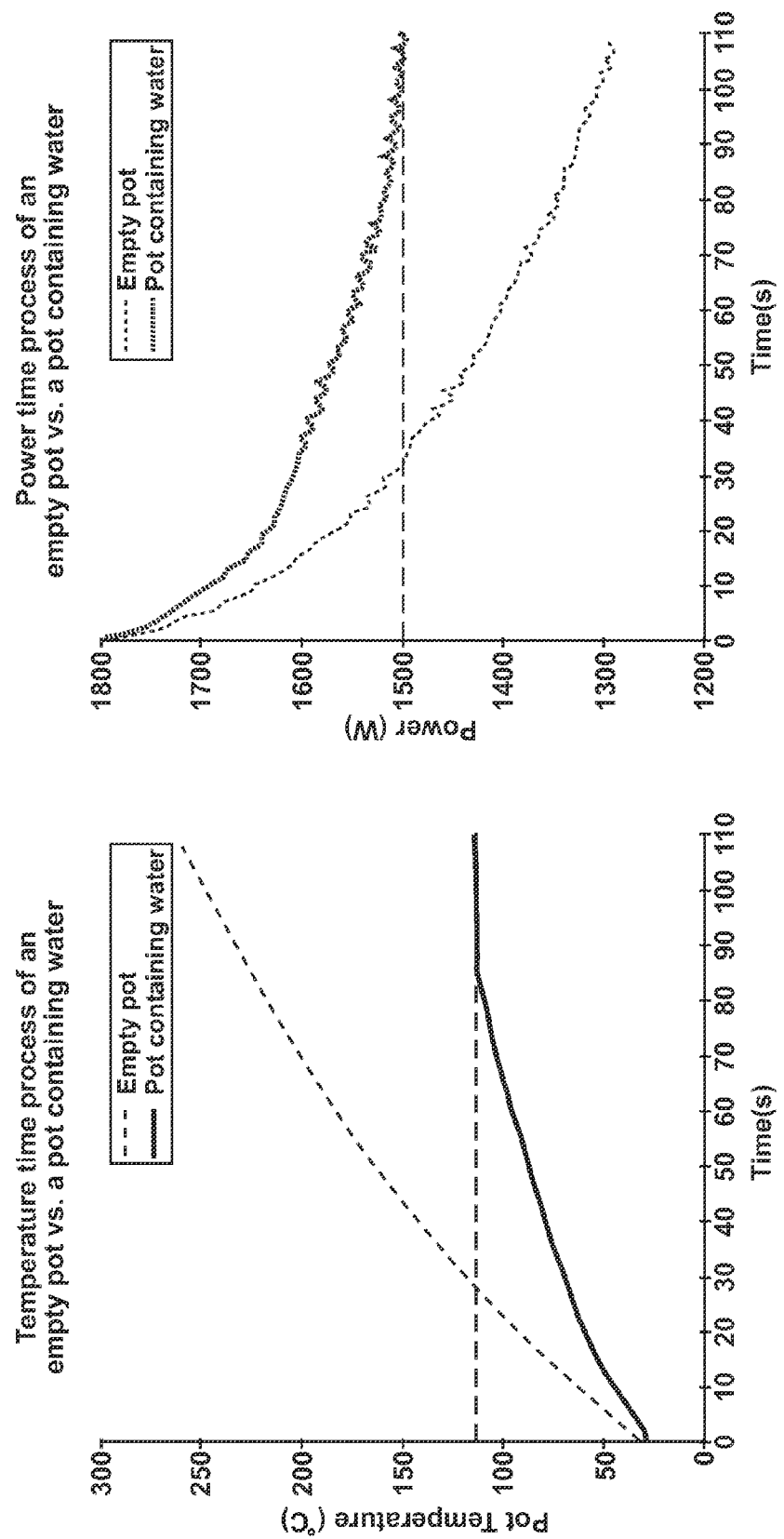
FIG. 2 are graphs showing a comparison between the behavior of an empty pot and the same pot containing water when the pot is heated with an induction heater supplied at constant frequency.

FIG. 2 illustrates the comparison between the behavior of an empty pot and the same pot containing water when the pot is heated with an induction heater supplied at constant frequency:

1. Pot containing water—before reaching boiling condition, the pot temperature roughly increases according to an exponential function of time; after boiling, the pot temperature is almost constant ($T_1$>Water boiling temperature). In other words, the pot temperature achieves an almost constant temperature in a finite time. Hence, the behavior after the boiling is different from the behavior before reaching the boiling condition.
2. Empty pot—pot temperature roughly increases according to an exponential function of the time; in this case the pot temperature rises faster than for a pot containing water. The temperature tends to stabilize to a horizontal asymptote (at $T_2$>$T_1$).

Because of the correlation between the measured power and the pot temperature, the control system can distinguish two cases (pot+water versus empty pot). These examples show the variations of power during time due to the evolution of target physical process being observed (pot temperature). This approach is not robust enough since the measured power is correlated to many variables other than the pot temperature: all electrical variables are heavily affected by uncontrollable processes such as pot mismatching or power supply fluctuations. If such a "noise" occurs, the expected slope of power is altered and the control, which can be based on the analysis of time-varying magnitudes, has a high probability to fail.

Figure 3:
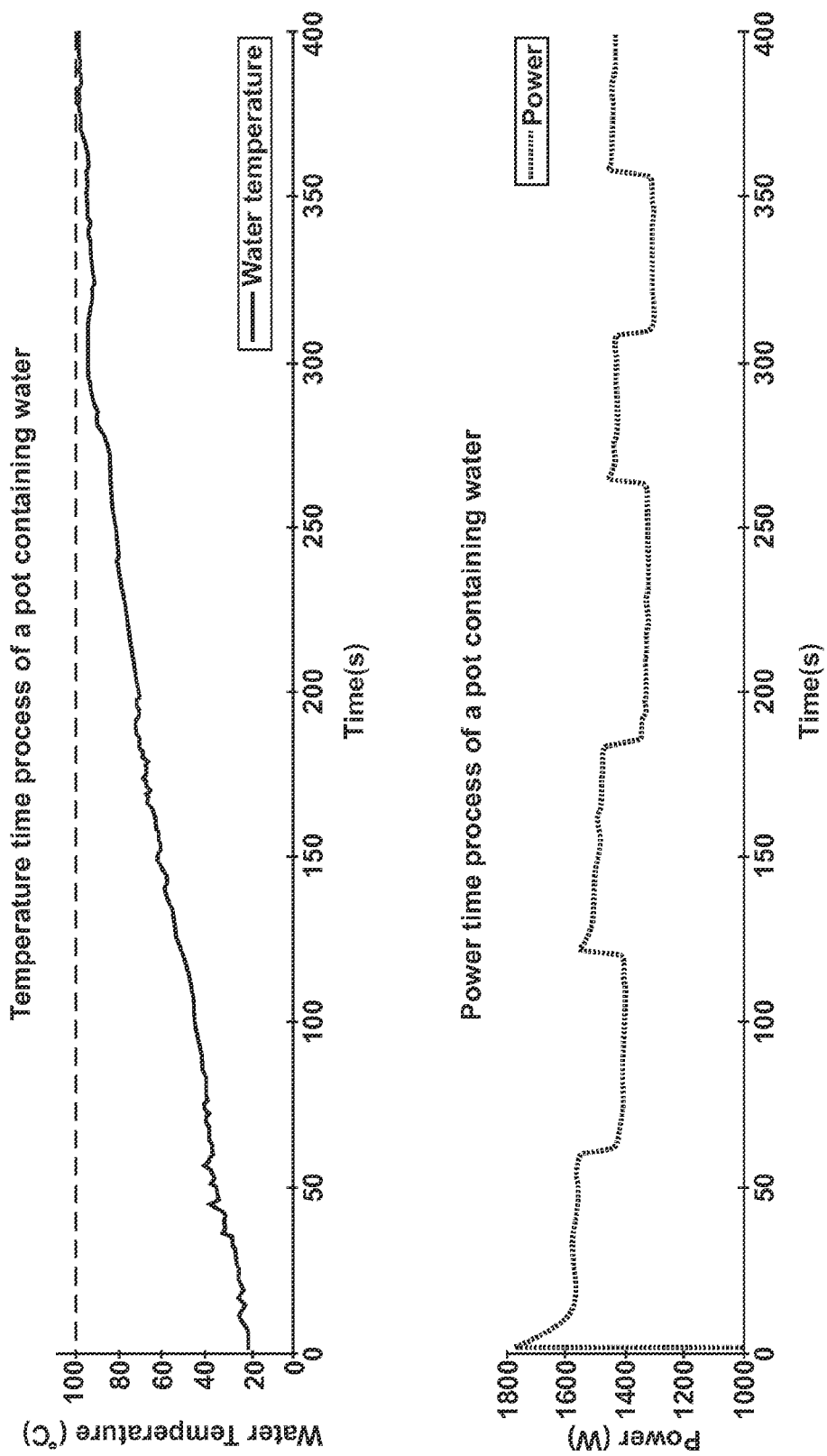
FIG. 3 are graphs showing the effect of pot mismatching on the time process of power.

In FIG. 3, which illustrates the effect of pot mismatching on the time process of power, the pot mismatching consists in a displacement of 4-5 cm of the pot, occurring in a time of less than one second. The power signal shows a 20% level shift in correspondence of each pot mismatching, while temperature signal is almost unaffected by pot mismatches.

Figure 4:
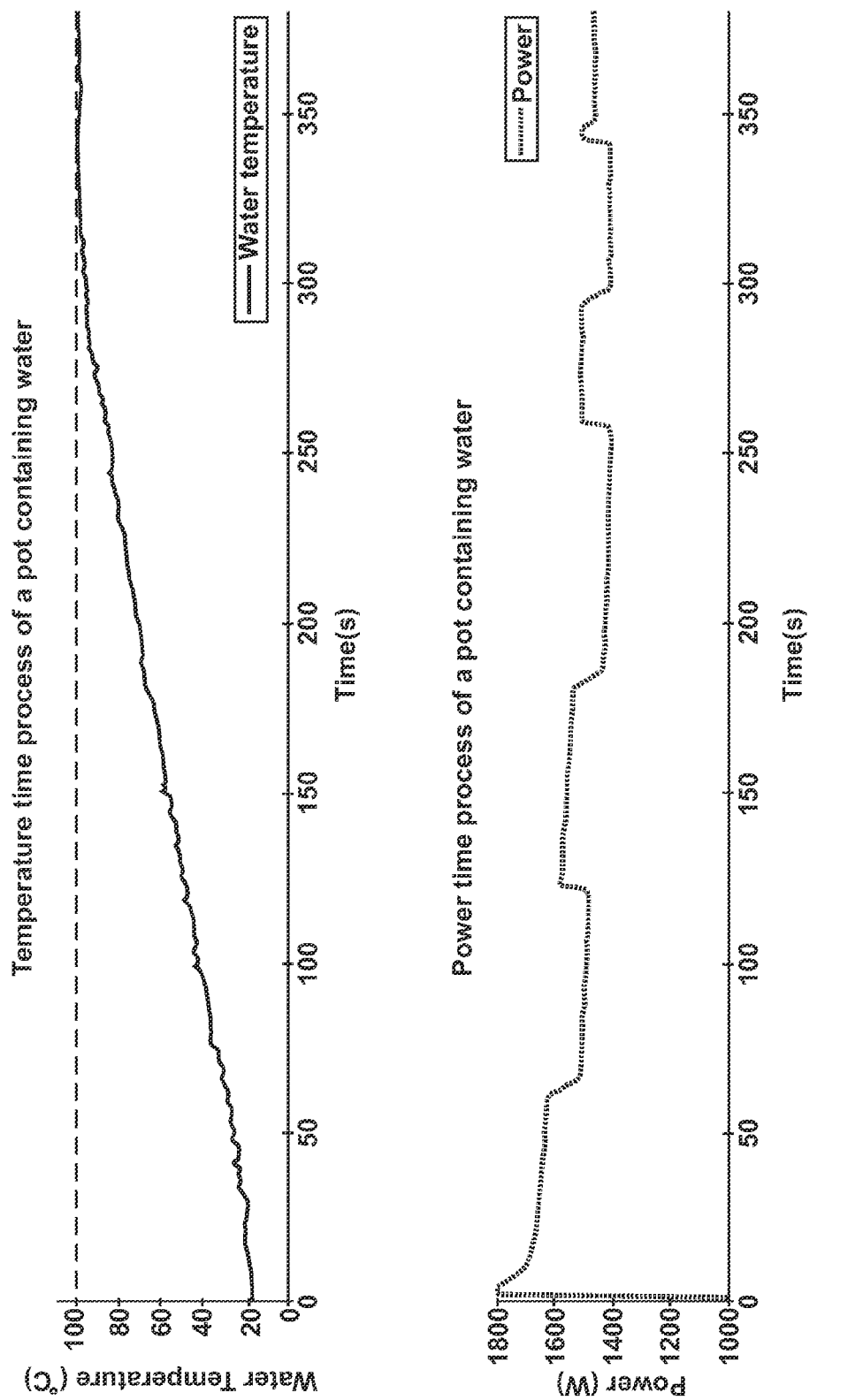
FIG. 4 is the graphs showing the effect of line voltage fluctuation on the time process of power.

Referring to FIG. 4, which illustrates the effect of line voltage fluctuation on the time process of power, the line voltage fluctuation consists in 5-6 V fluctuation, occurring in a time varying from one to three seconds. The Line voltage noises have been produced with the same time distribution of the pot mismatches of FIG. 3, in order to show how pot mismatches and line voltage fluctuation have a very similar effect on the power signal.

Figure 5:
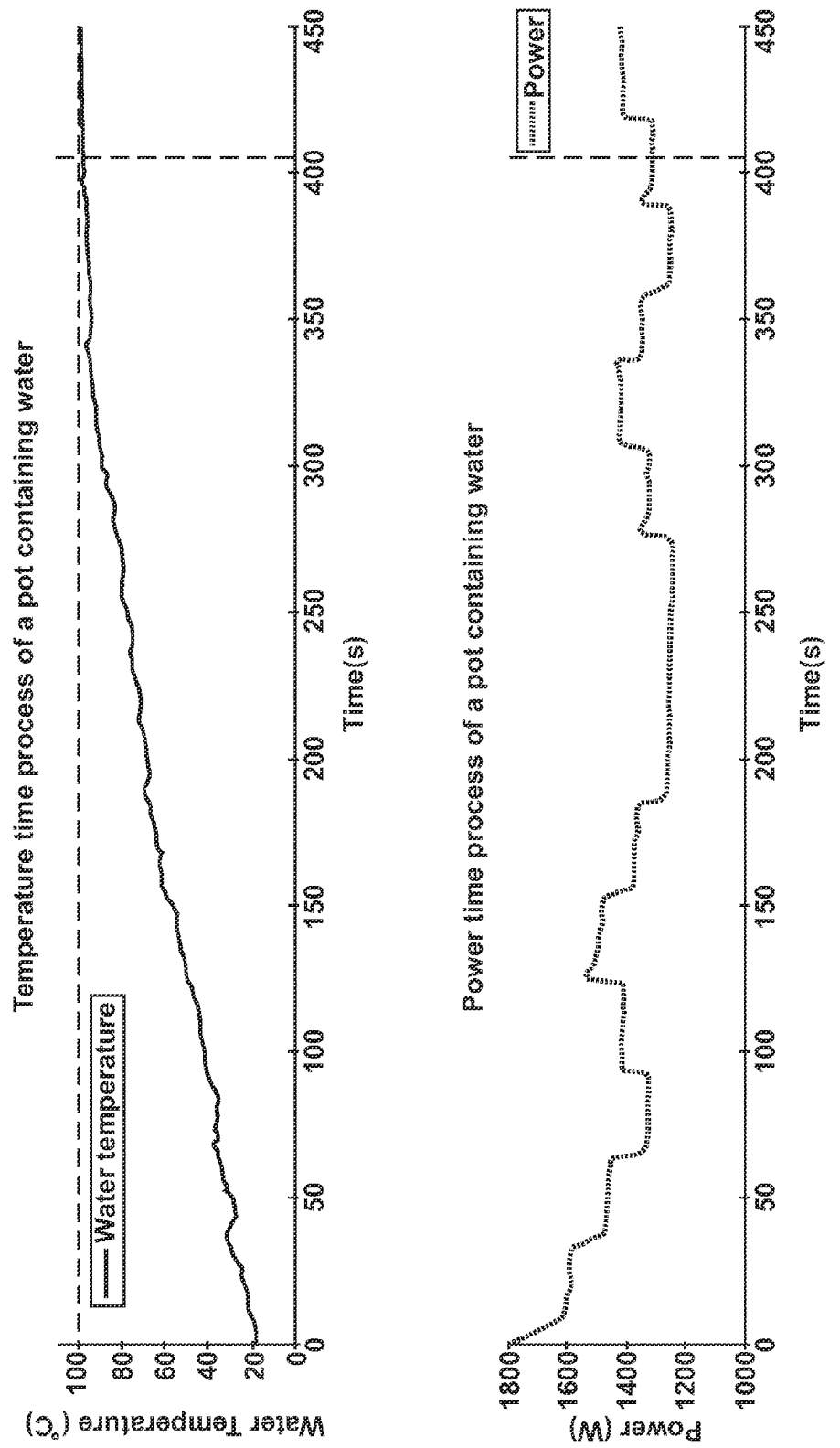
FIG. 5 is the graphs showing the effect of simultaneous pot mismatching and line voltage fluctuation on the time process of power.

In FIG. 5, which illustrates the effect of simultaneous pot mismatching and line voltage fluctuation on the time process of power, a displacement of 4-5 cm of the pot or a line voltage variation of 5-6 V may cause the power output to vary up to a hundred Watts. As a result, the correlation between power and temperature results is highly compromised. The expected asymptotic behavior of power versus time in correspondence to the boiling point is no longer evident. With such a power input signal, the induction control would fail to sense when water starts boiling.

Figure 6:
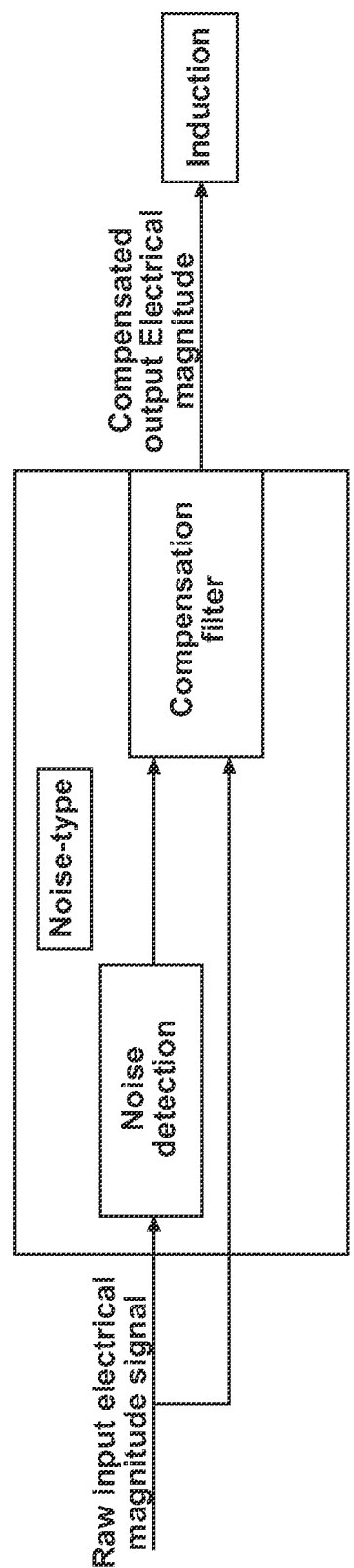
FIG. 6 is a flowchart illustrating the method of the preferred embodiment.

Referring to FIG. 6, the method of the embodiment disclosed comprises two steps, a noise detection step and a calculation of a noise-compensated output signal.

The first step (Step 1) may be more precisely defined as a detection of electrical noise present in the targeted electrical magnitude(s), correlating to the targeted physical process being controlled or monitored.

The noise detection block distinguishes the noise (time variations due to other concurrent processes) from the actual time-varying electrical magnitude that is correlated (in absence of noises) with the temperature of the pot.

The expected magnitude time behavior depends on the specific process being observed. For example, FIG. 4 shows the typical power slope of an induction heater in constant frequency mode heating a pot containing water from ambient temperature to boiling temperature.

Figure 7:
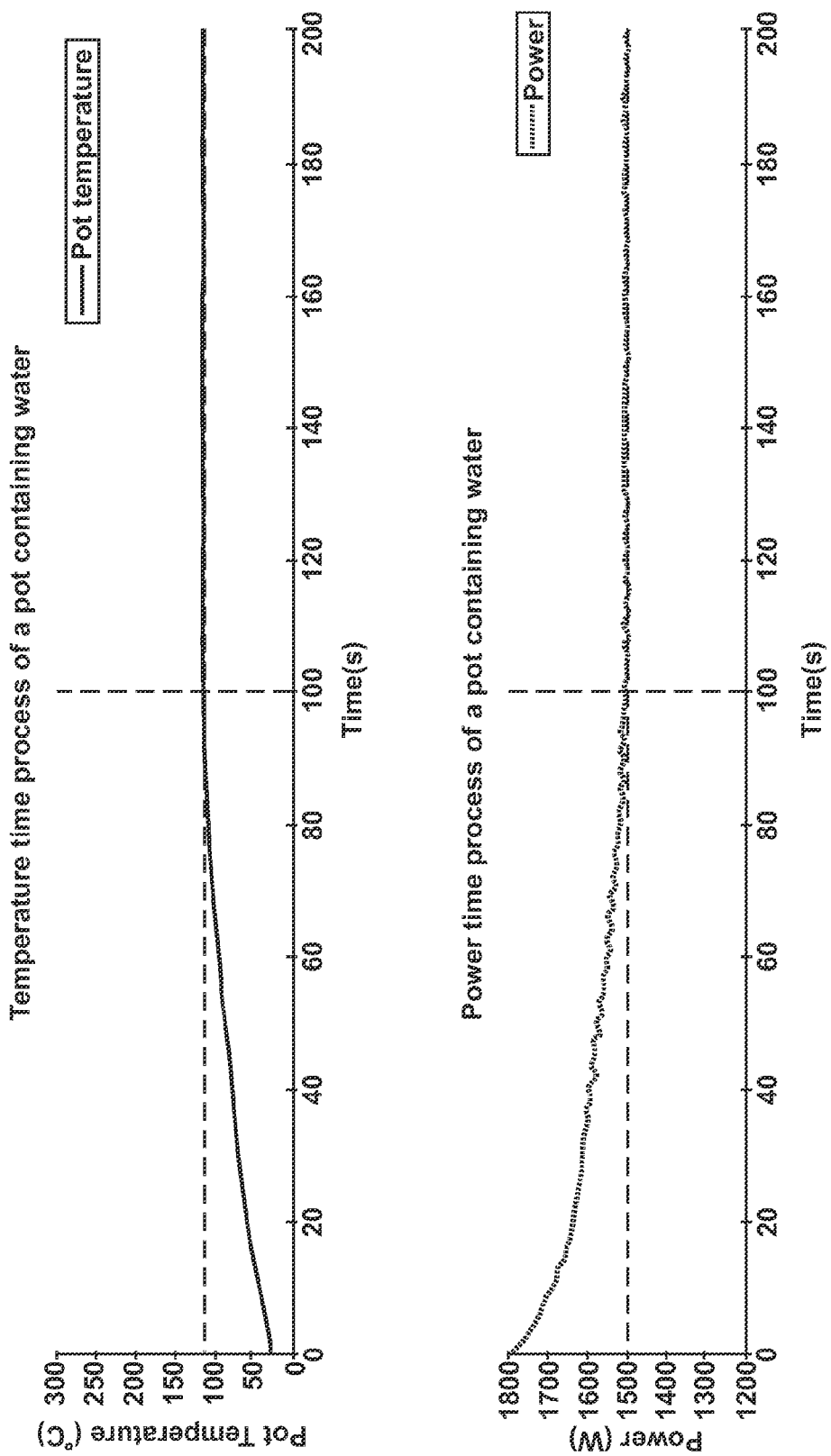
FIG. 7 illustrates a power signal unaffected by critical noises in the graphs showing the temperature change of a pot containing water over time and the corresponding power change over time.

The power signal shown in FIG. 7 is unaffected by critical noises (like pot mismatching or line voltage fluctuations). Small fluctuations are present due to the tolerance of the hardware sensing circuits. The dynamic of the magnitude is similar to the pot temperature. The power signal decreases monotonically and the maximum time gradient of power is −20 W/s. The first derivative of power has its maximum value at the beginning of the process, then it tends to zero as the boiling point gets closer. Once the boiling starts, the power level never changes until all the water evaporates.

The noise detection block may consist of a band pass-type filter centered in the frequency of the electrical magnitudes that are being observed in order to better detect the presence of electrical noise disturbances whose frequency components are different from the targeted physical phenomenon being observed. Moreover, the type of detected noise can be estimated on the basis of the frequency components sensed by the noise detection filter. The kind of electrical noise detected is passed to the compensation filter block that implements the best-fitted compensation filter for compensating the input signal against the specific noise having been detected.

Figure 8:
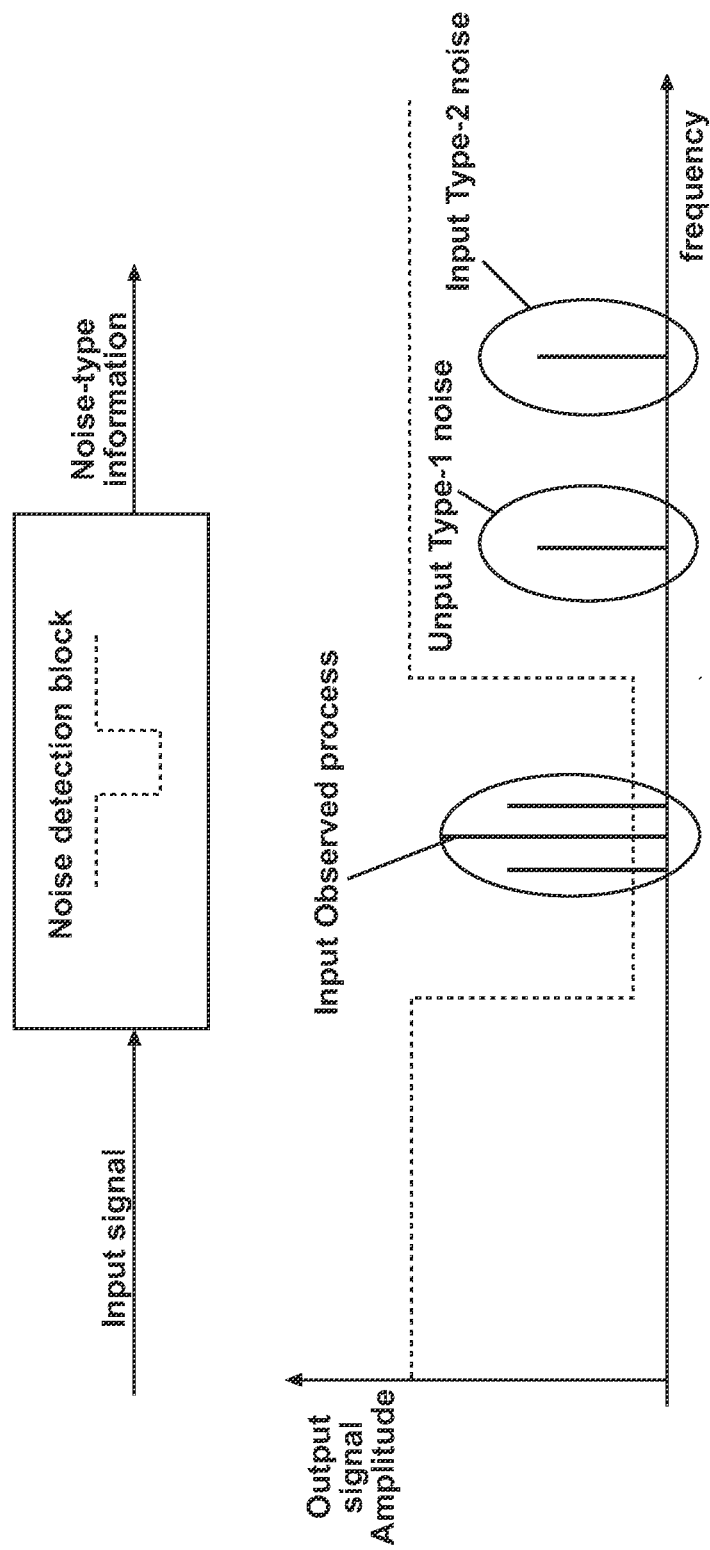
FIG. 8 is an illustration of a magnitude-frequency response curve of a band pass filter of the noise detection block.

As an example, FIG. 8 illustrates a magnitude-frequency response curve of a band pass filter of the noise detection block.

Shown below is an example of filter for the noise detection block where a high pass filter have been implemented as the noise frequencies are higher than the targeted physical process being observed.

The noise disturb is caused by pot mismatching and main line fluctuation. The conditions of the filter are:

value of the first derivative non-monotonically decreasing $$\rightarrow \frac{dP}{dt} > 0$$

$$\left|\frac{dP}{dt}\right| > \dot{P}_{threshold}$$

(The thresholds depends on the physical process to be controlled)

After a noise condition is detected, the noise detection block sends a signal to the compensation block indicating whether the input signal is disturbed by noise and if so, the identification of kind of noise present. The noise detection block keeps analyzing the raw input signal in order to detect the disappearance of the electrical noise.

Figure 9:
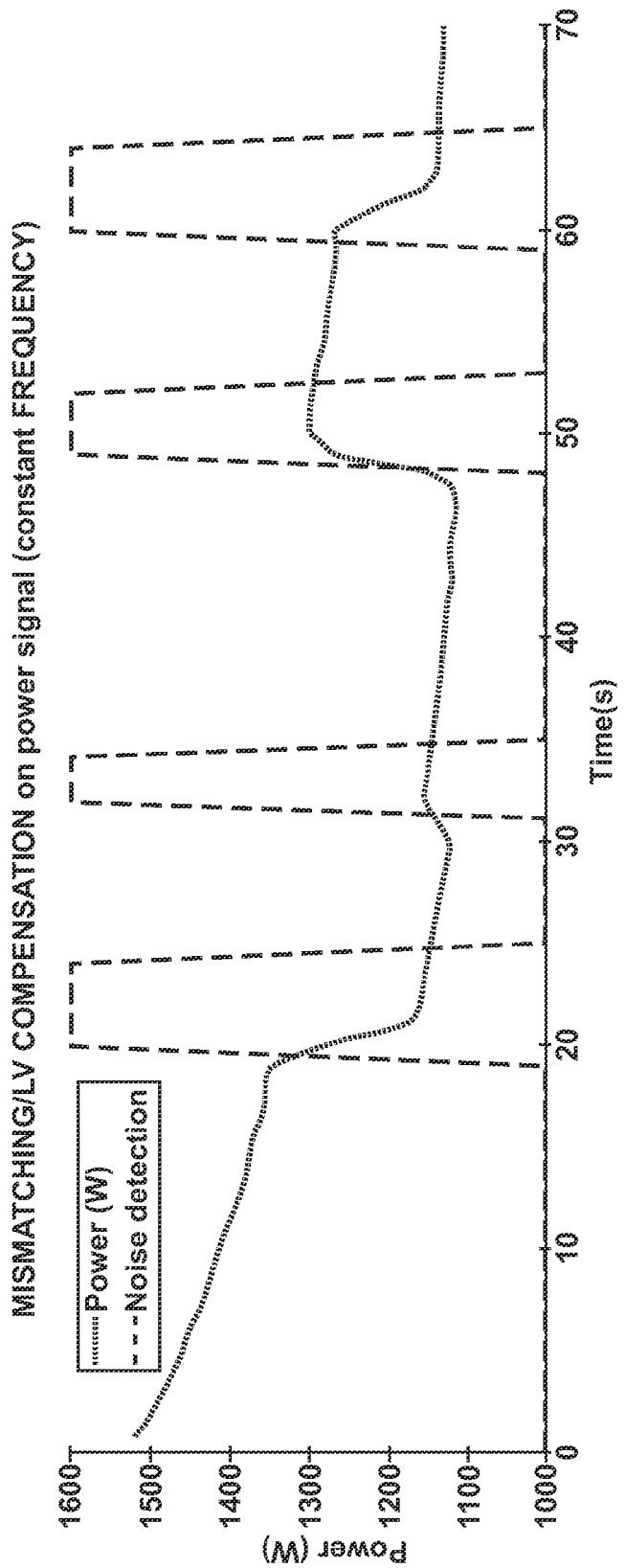
FIG. 9 is a graph of an example of noise detection on a power signal affected by pot mismatching noise.

FIG. 9 illustrates an example of the application of the noise detection on a power signal, as shown in solid line, affected by pot mismatching noises. The noise detection signal, as shown in dotted line, is at a high level during noise detection periods.

The second step of the method (Step 2) is a calculation of the noise-compensated output signal.

After the noise detection is fulfilled, the compensation filter is applied to the input signal. The compensated output signal shows the expected time variation of the input signal as if it were unaffected by noises.

Below are examples of building compensated output signals. The different ways of compensating the input signal will depend on the dynamic of the targeted physical phenomenon and the kind of electrical noise detected by the noise detection block.

The compensation filter may include "freezing out" the output signal, such that when a noise is detected, the output signal remains equal to the last input value before the noise is detected. Once the noise is no longer detected, the output signal is equal to the input plus an offset, which is calculated as the difference between the last input value before noise detection and the first value after noise detection.

Figure 10:
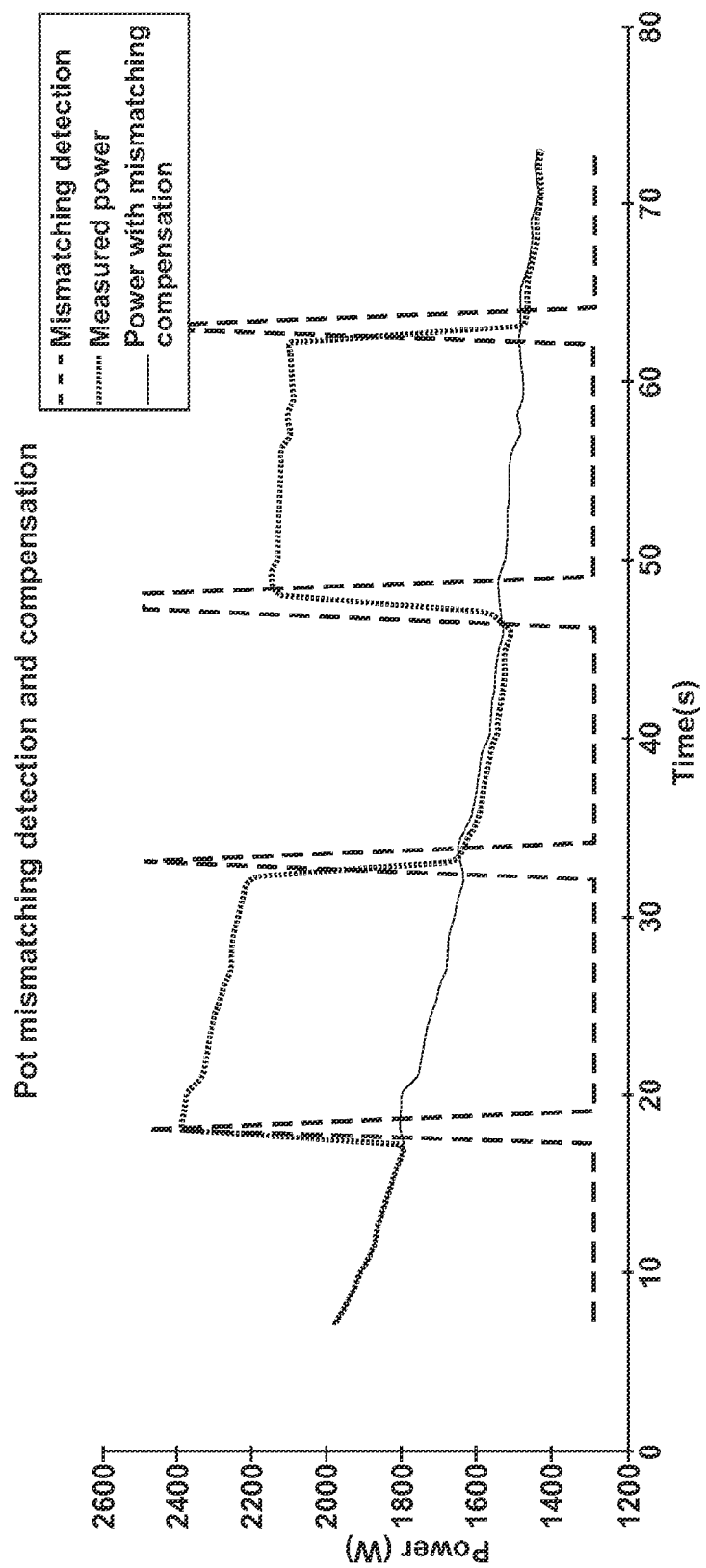
FIG. 10 is a graph showing the power signal affected by pot mismatching noise, noise detection, and a generated compensation power signal.

FIG. 10 shows the input power signal affected by pot mismatching noise, the noise detection signal, and the compensated power signal generated as detailed above. The compensated output signal preserves the dynamic of the physical process that is observed by the control.

The offset after noise detection condition may be calculated as follows:

$$\begin{cases} \text{offset} = P_a - P_b \\ \overline{Poutput}_{a+i} = P_{a+i} + \text{offset} \\ \quad i=1,2,\ldots,n \end{cases}$$

Wherein, P is the input signal, Pb is the last input signal value before noise has been detected, Pa is the first input signal value after the end of noise detection and Pa+i are the input signal values after Pa, Poutput is the compensated output signal:

Rather than adding an offset after noise detection, the output power versus the input value may be normalized before the noise condition. This method allows for a more realistic signal compensation because it takes into account how the power fluctuations affect the time slope of the electrical magnitude correlation versus the observed physical phenomenon:

$$\begin{cases} K_{norm} = \dfrac{P_b}{P_a} \\ \widehat{Poutput}_{a+i} = K_{norm} \cdot P_{a+i} \\ {\scriptstyle i=1,2,\ldots,n} \end{cases}$$

Wherein, Pb is the last signal value before the noise condition, Pa is the first signal value after the end of the noise condition, and Pa+i are the normalized output signal values after Pa.

For the method of "freezing out" the compensated output signal during the noise detection, the time interval is not acceptable for the control since it may need a constant time-varying signal and cannot accept a "frozen-out" input signal for a long time interval. A predictable model may be used that estimates noise-free time varying magnitude while the noise condition is being detected based on past input signals. The type of predictable model used can be modified based on the kind of electrical noise detected.

A simple predictive model may be based on linear regression of the last N signal values before noise detection. Being $\{(P1,t1), (P2,t2), \ldots, (PN,tN)\}$ the last N samples of the signal P, signal prediction rule for time tk while a noise condition is detected:

$$P_k = \{P_{k-1}, \ldots, P_{k-N}\}$$

$$t_k = \{t_{k-1}, \ldots, t_{k-N}\}$$

$$(m_k, q_k) = LR(P_K, t_k, N) \quad LR = \text{Linear Regression of last } N \text{ samples } (P_i, t_i)$$

$$\widehat{P}_k = m_k \cdot t_k + q_k$$

Figure 11:
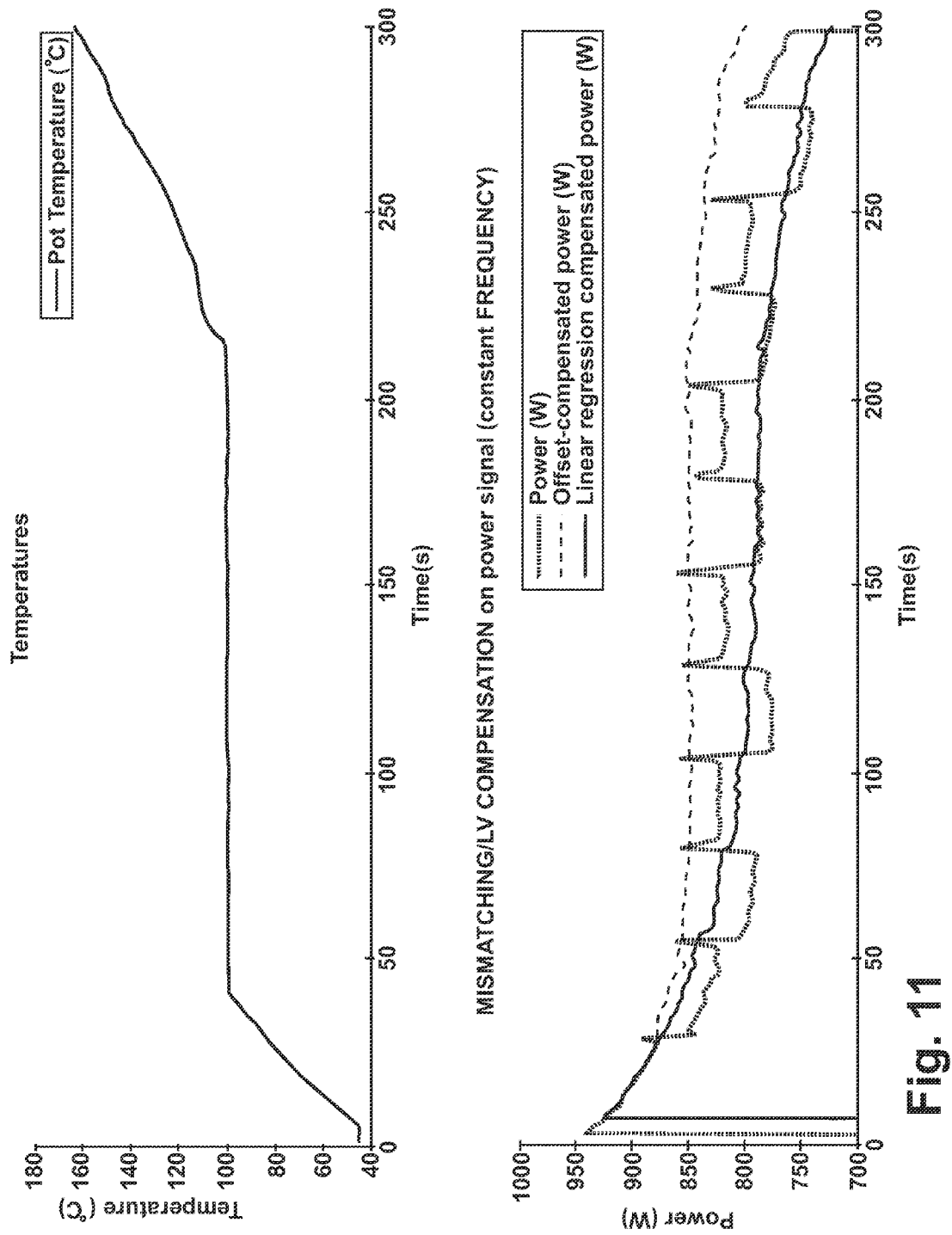
FIG. 11 illustrates a frozen-out offset-compensated signal and a linear transgression compensated signal.

FIG. 11 depicts a comparison between a frozen-out offset-compensated signal and a linear regression compensated signal that presents a more realistic behavior. Once the noise condition no longer detected, the output signal value may be calculated as the input signal plus an offset, which is calculated as the difference between the last predicted Pk value and the first value after noise detection.

$$\begin{cases} \text{offset} = P_a - \widehat{P}_k \\ \widehat{P}_{a+i} = P_{a+i} + \text{offset} \\ {\scriptstyle i=1,2,\ldots,n} \end{cases}$$

Instead of calculating and adding the offset, it can be normalized as described here below:

$$\begin{cases} K_{norm} = \dfrac{\widehat{P}_k}{P_a} \\ \widehat{P}_{a+i} = K_{norm} \cdot P_{a+i} \\ {\scriptstyle i=1,2,\ldots,n} \end{cases}$$

Prediction methods other than linear regression, such as exponential ones, may be applied as well. The observed noise may determine what the most efficient prediction method to be applied is.

This disclosure presents a solution to the problem of noises in controlling induction cooktops, allowing the use of methods for observed temperature process control using electrical magnitude(s) of the system in real applications, even in presence of pot displacements, unstable line voltage or other noise sources.

The present method includes a modular algorithm that detects noise disturbances and compensates the input signal of the targeted magnitude in a transparent way for the induction control. Few computational resources are required, allowing implementation in chip microcontrollers. Different variants of implementations of the method may occur as described herein. Such as in the case of pot mismatching and line voltage fluctuation or a method to extend or calibrate the detection and compensation function to other specific noises.

Other variants of the method, such as different implementations with different performances, may be used as well, according to the measuring apparatus available on the system and the output requirements of existing functions.

While this disclosure has been specifically described in connection with certain specific embodiments thereof, it is to be understood that this is by way of illustration and not of limitation. Reasonable variation and modification are possible within the scope of the foregoing disclosure and drawings without departing from the spirit of the invention which is defined in the claims.

We claim:

1. A method for detecting and compensating effects of disturbances in an induction heating system that controls a temperature of a cooking vessel or its content comprising:
   determining an electrical measurement at an input of a control unit, the electrical measurement comprising a time-varying electrical magnitude correlated to the temperature of the cooking vessel, and a noise effect on the electrical measurement from cooking vessel movement, mains line voltage variation, and other electrical noises;
   detecting the noise on the electrical measurement; and
   compensating for the noise effects by carrying out an analysis of the electrical measurement in one of a time or frequency domain.

2. The method according to claim 1, in which the induction heating system further comprises power transistors, wherein the method further comprises keeping a switching frequency of said power transistors constant, and determining the electrical measurement further includes obtaining an electrical signal from power or current absorbed by the heating system, said electrical signal varying with time and being correlated to the temperature of the cooking vessel or its content.

3. The method according to claim 1, in which the induction heating system further comprises power transistors, wherein the method further comprises keeping power delivered to the cooking vessel constant, and determining the electrical measurement further includes obtaining an electrical signal from a switching frequency of the power transistors, said electrical signal varying with time and being correlated to the temperature of the cooking vessel or its content.

4. The method according to claim 1, in which the induction heating system further comprises power transistors, wherein the method further comprises keeping current absorbed by the induction heating system constant, and determining the electrical measurement further includes obtaining an electrical signal from a switching frequency of the power transistors.

5. The method according to claim 1, wherein the method further comprises keeping the temperature of the cooking vessel or its content constant using the electrical measurement correlated to the temperature the cooking vessel or its content, and obtaining the electrical measurement from power or current absorbed by the induction heating system.

6. The method according to claim 1, wherein the induction heating system further comprises a combination of one or more controls and determining the electrical measurement further includes obtaining an electrical signal that varies with time and is correlated to the temperature of the cooking vessel.

7. The method according to claim 1, wherein determining the electrical measurement further includes obtaining an electrical signal and the method further comprises monitoring a first derivative of the electrical signal.

8. The method according to claim 1, wherein determining the electrical measurement further includes obtaining an electrical signal and compensating for the noise effects, and the method further comprises detecting a change in the electrical signal signifying starting of a disturbance, calculating a difference between the electrical signal both before the change and after the change, and applying an offset corresponding to the difference between the signals before and after the change to the electrical signal.

9. The method according to claim 1, wherein compensating for the noise effects includes applying a compensation filter calculated on a computer readable medium within the control unit calculated from the following criteria:

$$\begin{cases} K_{level} = f_{lvl}(P_a) \\ K_{norm} = \dfrac{P_b}{P_a} \\ \widehat{P}_{a+1} = K_{level} \cdot K_{norm} \cdot P_{a+i} \\ \phantom{\widehat{P}_{a+1}}_{i=1,2,\ldots,n} \end{cases}$$

Where:
P is the measured electrical signal;
$K_{level}$ is a coefficient or a function $f_{lvl}$ of the power level;
$K_{norm}$ is a normalization factor;
$P_b$ is the last signal value before disturbance has been detected;
$P_a$ is the first signal value after the end of disturbance; and
$P_{a+i}$ are the signal values after $P_a$.

10. The method according to claim 1, wherein determining the electrical measurement further includes obtaining an electrical signal, compensating for the noise effects further includes detecting a change in the electrical signal signifying starting of a disturbance and cutting the signal after detection of the change.

11. The method according to claim 1, wherein determining the electrical measurement further includes obtaining an electrical signal value correlated to the temperature, and compensating for the noise effects further includes detecting a change in the electrical signal signifying starting of a disturbance and, after the change is detected, keeping the electrical signal constant for a predetermined time interval and equal to the value of the signal before the change is detected.

12. The method according to claim 1, wherein the electrical measurement is at least one of frequency, current, voltage, or power factor.

13. An induction heating system for heating cooking vessels comprising:
an induction heating unit; and
a control unit for detecting and compensating for effects of disturbances in the induction heating unit, with the control unit monitoring or controlling a temperature of a cooking vessel or its content based on at least one electrical measurement correlated to the temperature thereof constituted by a measured electrical signal, said control unit including a noise detection block configured in electrical communication with an input signal of the control unit for detecting noise in the input signal caused by cooking vessel movements, mains line voltage fluctuation or an electrical measurement noise, the control unit being adapted to carry out an analysis in time or frequency domain of said at least one electrical measurements and provide a compensated output signal for controlling induction heating.

14. The induction heating system according to claim 13, wherein the heating system further comprises power transistors, wherein a switching frequency of said power transistors is held constant by the control unit, the measured electrical signal varies with time and correlates to the temperature of the cooking vessel, and the measured electrical signal is obtained from power or current absorbed by the induction heating system.

15. A method for detecting and compensating for noise caused in an induction heating system that controls a temperature of a cooking vessel comprising:
measuring an electrical signal at an input of a control unit that varies with time and correlates to the temperature of the cooking vessel;
detecting a presence and type of electrical noise in the electrical signal by passing the electrical signal through a filter;
sending a signal to a noise compensation block indicating the presence and type of electric noise in the electrical signal;
creating a noise cancellation signal based on the presence and type of electrical noise;
combining the electrical signal with the noise cancellation signal to produce a compensated output signal which is substantially unaffected by the electrical noise; and
utilizing the compensated output signal in controlling the induction heating system.

16. The method according to claim 15, wherein creating the noise cancellation signal includes using a predictive model based on linear regression of the electrical signal before detecting the presence of electrical noise.

17. The method according to claim 15, further comprising: determining that the electrical noise is no longer detected, and wherein creating the noise cancellation signal includes using an offset value as the noise cancellation signal.

18. The method according to claim 15, wherein detecting the presence of noise includes determining if a first derivative of the electrical signal is above a threshold value.

* * * * *